H. WURTZ.
PROCESS FOR THE RECOVERY OF THE PARAFFIN INGREDIENTS FROM CANNEL COALS AND OTHER SIMILARLY CONSTITUTED BITUMINOUS MATERIALS WITHOUT CHANGE IN THEIR CHEMICAL COMPOSITION.
APPLICATION FILED NOV. 21, 1904.
977,992.
Patented Dec. 6, 1910.
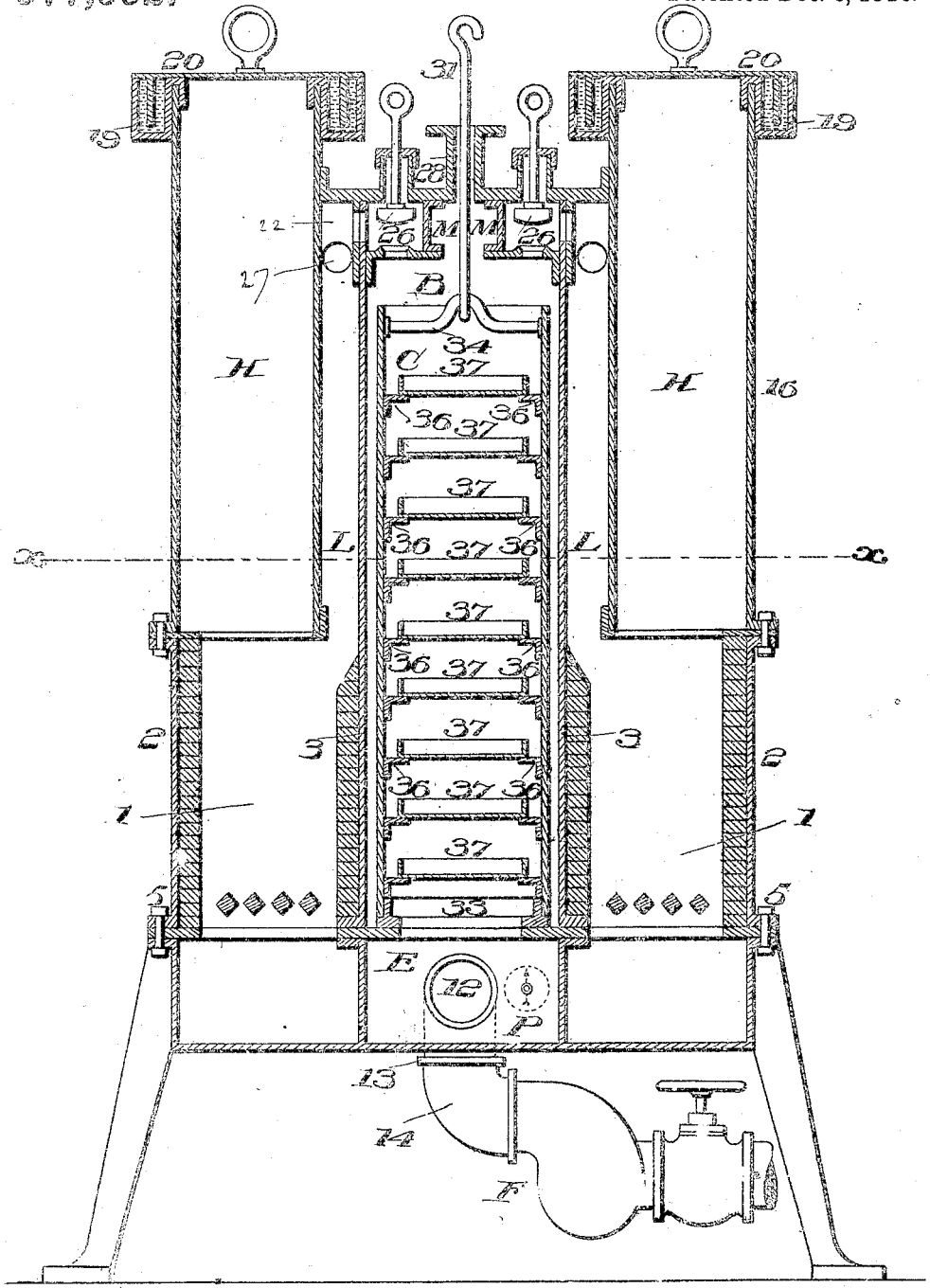
WITNESSES:
INVENTOR.
Henry Wurtz
BY
ATTORNEY.

UNITED STATES PATENT OFFICE.

HENRY WURTZ, OF NEWARK, NEW JERSEY, ASSIGNOR TO AMERICAN CHEMICAL EDUCTION COMPANY, A CORPORATION.

PROCESS FOR THE RECOVERY OF THE PARAFFIN INGREDIENTS FROM CANNEL-COALS AND OTHER SIMILARLY-CONSTITUTED BITUMINOUS MATERIALS WITHOUT CHANGE IN THEIR CHEMICAL COMPOSITION.

977,992.            Specification of Letters Patent.      Patented Dec. 6, 1910.

Application filed November 21, 1904. Serial No. 233,706.

*To all whom it may concern:*

Be it known that I, HENRY WURTZ, a citizen of the United States of America, residing at Newark, in the county of Essex and State of New Jersey, have invented certain new and useful Improvements in the Process for the Recovery of the Paraffin Ingredients from Cannel-Coals and other Similarly-Constituted Bituminous Materials without Change in Their Chemical Composition, the following being a full, clear, and exact specification of the process, reference being made to the accompanying drawing, showing a vertical cross-section of the apparatus, taken through the center thereof, and to the Letters Patent of the United States No. 821,323, granted on my application filed April 13, 1905, Serial No. 255,354, to my assignees, the American Chemical Eduction Co., a corporation, on the 22d day of May, 1906, and by means of which or other suitably-constructed apparatus this process may be carried on, therereinafter explained.

Cannel coal and similarly constituted materials, contain a very large percentage of hydrocarbons, ranging in consistence from solid paraffins to light oils of the same series. These hydrocarbons are intimately mixed with the solid ingredients, carbon and incombustible mineral substances, which form the basic structure of these materials, and while they can be separated from the solid constituents by distillation, they cannot be recovered by any distilling process, heretofore known, in a chemically unchanged condition, because they are rapidly dissociated by such temperatures as must, necessarily, be employed in any distilling process, to expand them sufficiently so they may escape from the retort, and because when in such heated state, these hydrocarbons are extremely susceptible of oxidation, and their elements and chemical combinations are highly disposed and stimulated to form new combinations, which are chemically different from the hydrocarbons, originally contained in cannel coal and similarly constituted bitumen, and not capable of reconversion.

The object of my invention is to recover from cannel coal and similarly constituted bituminous raw materials, these hydrocarbon ingredients, particularly those of the paraffin series, without change or material modification in their chemical composition.

Cannel coal and similar bituminous compounds may be compared in respect to the relative arrangement of their constituent ingredients with that of a fibrous porous combustible structure, filled with fat and waxy substances, melted and mixed with proportionate quantities of a more liquid oily substance of corresponding chemical nature and with some absorbent, incombustible mineral matter in more or less pulverized state, and then cooled and compressed; the more fluid, oily, ingredients being in the first instance, and more largely, absorbed by the pulverized absorbent mineral matter and thus held suspended in the less fluid fat or wax matter, and both intimately intermingled (absorbed) by the absorbent fibrous structure of the fibrous combustible structure. Bituminous coal is such a compound which subsequent cooling and simultaneous compression rendered solid and apparently homogeneous. In this process of forming such compounds, no chemical change takes place, and therefore, by reversing the process of formation, their constituent ingredients may be separated from each other. This is effected by the process of consuming the coal in a furnace. If such coal is heated sufficiently in a furnace, to melt the waxy hydrocarbon, the latter separates from the fibrous non-meltable structure of the carbon, and this carbon combines with the heated oxygen of the air and is consumed. Then also the more fluid hydrocarbons are decomposed by the heat, some of their elements consumed, and others are converted into gases. If such coal is thus heated in a hermetically closed retort, the carbon and the oxidable constituents of the hydrocarbons are not so consumed, but if the separation of the hydrocarbons from the carbon of the coal is to be effected by such a treatment, the hydrocarbons of the bituminous compound must necessarily be expanded to such an extent that they decompose, and are largely, if not totally, converted into fixed gases and other less valuable products. This is the unavoidable result of every process of distilling coals, and while in distilling coal at low temperatures (from red heat down to about 200° F. below red heat, the latter temperature being the lowest, at which any distillation of coal can be conducted) a smaller proportion of such hydrocarbons is thus decomposed, the ultimate result is, in quantity and quality of the product, not increased, because by a process of distillation, at such low temperatures, again a correspondingly larger proportion of the hydrocarbons is then not separated or removed from the carbon and the mineral constituents forming the fibrous and porous structure of the coal. This explains why the quantitative yield of such hydrocarbon products is not appreciably larger in "distilling" at low temperatures than in distilling at high temperatures, and also why such distilling processes were found not suitable for commercially recovering such hydrocarbons as are contained in cannel coal and other similarly constituted bituminous compounds. To obtain all hydrocarbon ingredients of cannel coal, and other similarly constituted materials, and to recover them in a chemically unchanged condition, I subject such bituminous raw material, in an atmosphere of neutral (deoxidized) gases, to a temperature only sufficient to render these hydrocarbons fluid, and then to suction by a strong, mechanically produced current of these neutral gases, whereby the hydrocarbons, having been rendered sufficiently fluid by the heating, are separated and removed from the solid constituents of the material treated. The suction, created by the current, materially reduces the pressure in the chamber, where the bituminous raw material is thus treated, thus creating a condition favorable to expansion and assists also materially in extracting the hydrocarbons of higher degree of consistency from among the fibers and pores of its carbon structure. The neutral gases, enveloping the hydrocarbons thus extracted, constantly, during this transitory period, while they are in this heated and fluid state, prevent their oxidation, and neutralize their tendency to split and form other chemical compounds. Finally, the hydrocarbons are separated from the protecting neutral gases by condensation. This is effected by cooling the current of neutral gases, conveying the hydrocarbons in their fluid state, though a large proportion of the specifically heavier hydrocarbons is quite rapidly precipitated from the gaseous vehicle as soon as the velocity of the current is diminished. The chemical composition of hydrocarbon constituents of cannel coal and of similar bituminous materials thus recovered, is not changed, or in any respect materially modified. They are recovered in their crude state, and to render them available for further industrial uses, they must be separated from each other and refined. The processes for separating and for refining them are no part of the invention set forth and claimed herein, and therefore, are not described.

An apparatus suitable for carrying on this eduction process is shown in the drawing, illustrating a vertical transverse section thereof, and consists, essentially, of an eduction chamber B, designed to be hermetically closed after the charge of the cannel coal or of a similar bituminous material was placed therein; an exhauster F, connected by a conduit 14 with the bottom part E of the eduction chamber; chambers 1 for producing or heating the neutral (deoxidized) gases; flues L for conveying these neutral gases into the eduction chamber, and devices (valves 26) for governing their admission.

The apparatus, designed by me for experimental practice of the process, herein set forth, and to demonstrate its industrial and commercial utility, is shown and more fully described in the aforementioned Letters Patent No. 821,323, granted to my assignees, the American Chemical Eduction Co., May 22, 1906. The apparatus was designed particularly with the object in view to employ deoxidized combustion gases, produced by the fires in chambers 1, as such neutral gases, and comprises, in addition to the above-recited essentials, the fuel magazines H, one set above each of the chambers 1 and provided with flanged lids 20, entering into the circular water troughs 19; and a crate C, provided with brackets 36, fixed to its sides, for supporting trays 37, whereon the raw material is disposed in comparatively thin layers. The crate C is dimensioned to fit and fill the interior of the eduction chamber B, its expansion by heat being considered; the trays 37 are made shorter than the longitudinal width of the crate, and are set therein so that their ends are alternately flush with one end of the crate. The conduits 22 for admission of the deoxidized combustion gases enter the eduction chamber at the top, above the first tray, and the conduit, connecting the eduction chamber with the exhauster, starts from bottom part E, below the last tray; consequently, the trays act as baffling plates, diverting the flow of the gases in a zig-zag course through the charge, before the gases are drawn out by the exhauster. By this arrangement of the trays in the eduction chamber, a more rapid and also quantitatively somewhat more exhaustive progress is made in the eduction process.

In the apparatus constructed as shown in the drawings, the fires are started in chambers 1, the flues, leading to the chimney, being then open, and the apertures 22 in the side walls of the eduction chamber shut. When the fires are sufficiently developed, the chimney flues are shut, and only such a volume of air is admitted through the grates as is, during its passage through the glowing fuel, safely deprived of all oxygen and brought to a temperature of about 750° F. Then the valves 26—one in each of the valve chambers M on top of the eduction chamber B—are opened and the exhauster F started, whereby the deoxidized combustion gases are drawn in a forced current through the charge of the material, exposed to their action in the eduction chamber, and already sufficiently heated, to render the hydrocarbons fluid to the extent required for drawing them out by suction and carry them into a condenser. During this transitive period, while the hydrocarbons are in a heated condition, they are enveloped by the deoxidized gases, which thus protect them from oxidation, and also neutralize their tendency to split and recombine. This protection continues until the hydrocarbons are separated from the gases by cooling and condensation.

The crude product of this process is an aggregation of hydrocarbons of the paraffin series. They are of the same chemical composition as they were contained in the bituminous substance, treated in the process; and range in consistency from solid paraffins to light oils of the same series. Besides these hydrocarbons the crude product contains some carbolic acid and bodies of the chinolin and acridin class. The total of these crude products averages well up to ninety per cent. of the difference between the weight of the bituminous material when charged into the apparatus and the weight of its dry residue when the eduction process is completed. The products of the eduction process are readily separated from each other and may be refined by any of the processes usually employed in this art. The aggregate of the purified and separated products should be about eighty per cent. of the crude product.

I claim as my invention:

1. The process for recovering, from cannel coal and similarly constituted bituminous compounds, their hydrocarbon ingredients of the paraffin series in chemically unchanged condition; the process consisting of the following steps:—(1) subjecting the material, from which the hydrocarbon ingredients are to be recovered, in an atmosphere of neutral (deoxidized) gases, to a temperature sufficient only to render the hydrocarbon ingredients of the material fluid; (2) then subjecting the material treated to the action of a current of heated neutral gases, the current being directed to contact with it; (3) drawing out, while continuing the current of neutral gases, the fluid ingredients of the material with the neutral gases; and (4) separating them from the neutral gases, all substantially as herein set forth.

2. The process for recovering from cannel coal and similarly constituted bituminous compounds, their hydrocarbon ingredients of the paraffin series in chemically unchanged condition; the process consisting of the following steps:—(1) enveloping the material, from which the hydrocarbon ingredients are to be recovered, by neutral (deoxidized) gases; (2) then subjecting the material to a current of neutral (deoxidized) gases and heating it to a temperature sufficient only to render its hydrocarbon ingredients fluid; (3) drawing out, while continuing the current of neutral gases, the fluid ingredients of the material with the neutral gases; and (4) separating them from the neutral gases, all substantially as herein set forth.

3. The process for recovering from cannel coal and similarly constituted bituminous compounds, their hydrocarbon ingredients of the paraffin series in chemically unchanged condition; the process consisting of the following steps:—(1) subjecting the material, from which the hydrocarbon ingredients are to be recovered, to a current of neutral (deoxidized) gases heated to not more than 750° F., whereby its hydrocarbon ingredients are rendered fluid; (2) drawing out, while continuing the current of neutral gases, the fluid ingredients of the material with the neutral gases; and (3) condensing the recovered mixture, whereby the hydrocarbons are separated from the neutral gases, all substantially as herein set forth.

In testimony that I claim the invention above set forth I have affixed my signature, in presence of two witnesses.

HENRY WURTZ.

Witnesses:
ADAM WIENER,
ARTHUR LOWE.